United States Patent [19]
Katayama et al.

[11] Patent Number: 5,371,606
[45] Date of Patent: Dec. 6, 1994

[54] IMAGE ENCODING APPARATUS

[75] Inventors: Akihiro Katayama, Kawasaki; Mitsuru Maeda, Yokohama; Yasuji Hirabayashi, Tokyo; Tadashi Yoshida, Ichikawa, all of Japan

[73] Assignee: Canon Kabushiki Kaisha, Tokyo, Japan

[21] Appl. No.: 970,250

[22] Filed: Nov. 2, 1992

Related U.S. Application Data

[63] Continuation of Ser. No. 458,362, Dec. 28, 1989, abandoned.

[30] Foreign Application Priority Data

Dec. 28, 1988 [JP] Japan ................. 63-332637

[51] Int. Cl.$^5$ ............................... H04N 1/00
[52] U.S. Cl. .................... 358/400; 358/426; 358/445
[58] Field of Search ............. 358/400, 401, 426, 445, 358/447, 467; 382/47, 54

[56] References Cited

U.S. PATENT DOCUMENTS

| | | | |
|---|---|---|---|
| 4,222,076 | 9/1980 | Knowlton | 358/470 |
| 4,261,018 | 4/1981 | Knowlton | 358/426 |
| 4,766,499 | 8/1988 | Inuzuka | 358/426 |
| 4,873,577 | 10/1989 | Chamzas | 358/426 |
| 4,876,604 | 10/1989 | Nobuta | 358/400 |
| 4,930,021 | 5/1990 | Okada | 358/445 |
| 4,970,603 | 11/1990 | Kanai | 358/400 |
| 4,982,292 | 1/1991 | Itoh et al. | 358/426 |

FOREIGN PATENT DOCUMENTS

| | | |
|---|---|---|
| 0146728 | 7/1985 | European Pat. Off. |
| 0272762 | 6/1988 | European Pat. Off. |
| 0357386 | 3/1990 | European Pat. Off. |
| 0357388 | 3/1990 | European Pat. Off. |
| 0370823 | 5/1990 | European Pat. Off. |

OTHER PUBLICATIONS

"A Picture Browsing System", *IEEE Transactions On Communications*, vol. Com-29, No. 12, pp. 1968-1976.
"Implementation of Threshold Bias Algorithm", *IBM Technical Disclosure Bulletin*, vol. 23, No. 1, pp. 79-80.
"Progressive Facsimile Coding Scheme for Interactive Image Communications", Electronics and Communications in Japan, Part 1, vol. 68, No. 12, pp. 84-93.
Patent Abstracts of Japan, Kokai Abstract 63-164759.

*Primary Examiner*—Richard Hjerpe
*Assistant Examiner*—Thomas L. Stoll
*Attorney, Agent, or Firm*—Fitzpatrick, Cella, Harper & Scinto

[57] ABSTRACT

An image encoding apparatus has a forming unit for forming a second image having a different resolution on the basis of a first image, an encoding unit for separately encoding the first and second images, and a changing unit for changing, between the encoding operations of the first and second images, the number or positions of reference pixels referred to by the encoding unit for encoding.

10 Claims, 12 Drawing Sheets

| 1 | 2 | 1 |
|---|---|---|
| 2 | C | 2 |
| 1 | 2 | 1 |

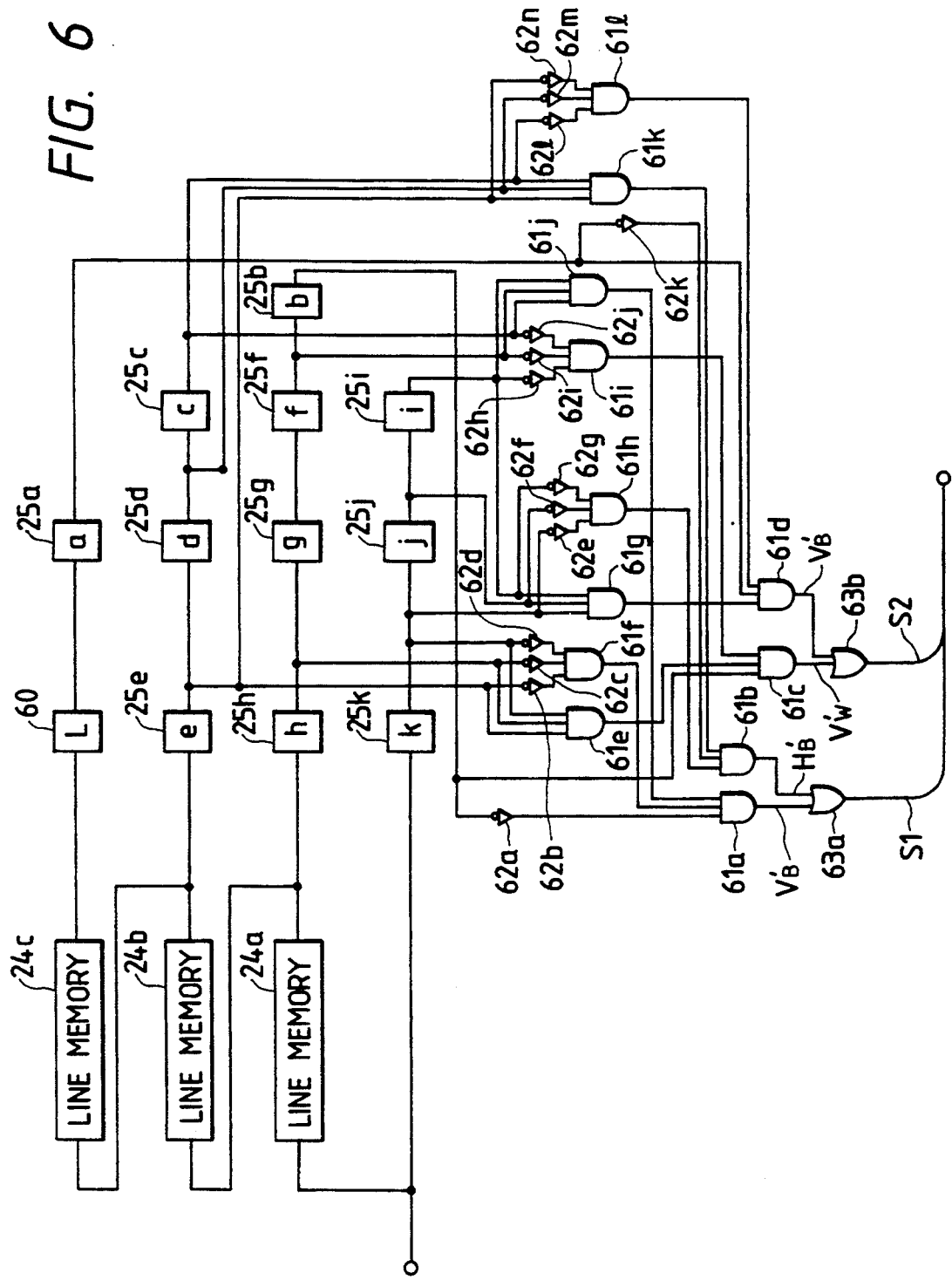

FIG. 7A
FIG. 7B
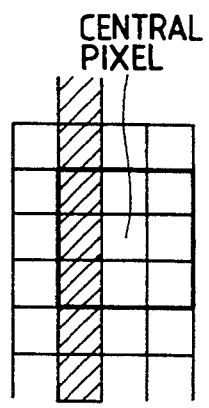
FIG. 8A
FIG. 8B
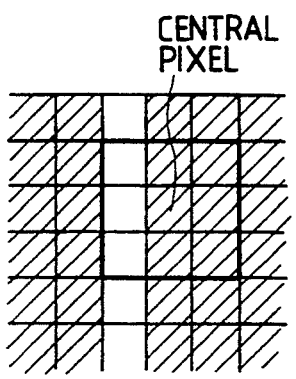
FIG. 10
| 4 | 2 | 3 |
|---|---|---|
| 1 | * |   |
FIG. 11
|   | 5 | 6 |
|---|---|---|
| 9 | 7 | 8 |

FIG. 16
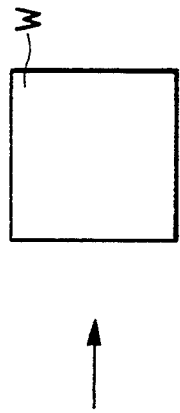
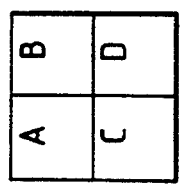
FIG. 17
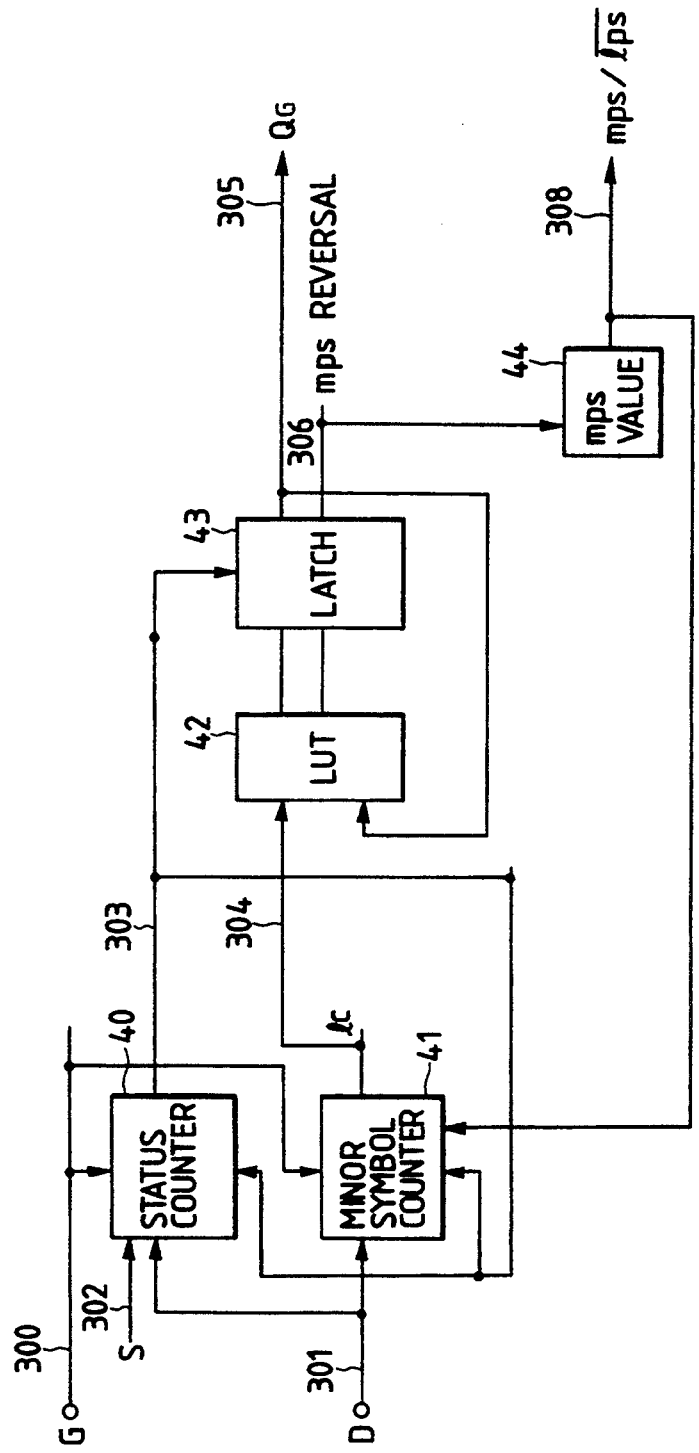

FIG. 18

| SIGNAL | 1st STAGE | 2nd STAGE | 3rd STAGE |
|---|---|---|---|
| 201 | 0 | 0 | 1 |
| 202 | 0 | 0 | 1 |
| 203 | 1 | 1 | 1 |
| 204 | 0 | 0 | 1 |
| 205 | 0 | 0 | 1 |
| 206 | 0 | 0 | 1 |
| 207 | 0 | 0 | 1 |
| 208 | 0 | 1 | 1 |
| 209 | 1 | 1 | 1 |
| 210 | 0 | 1 | 1 |
| 211 | 1 | 1 | 1 |

FIG. 20

| Q | 0/S | 1/S | ---------- | 1/2 | $> \frac{1}{2}$ |
|---|---|---|---|---|---|
| 1 | 2 | 2 | ---------- | 1 | 1* — 500 |
| 2 | 3 | 3 | ---------- | 1 | 1 |
| 3 | 4 | 3 | ---------- | 1 | 1 |
| ⋮ | ⋮ | ⋮ | | ⋮ | ⋮ |

FIG. 19

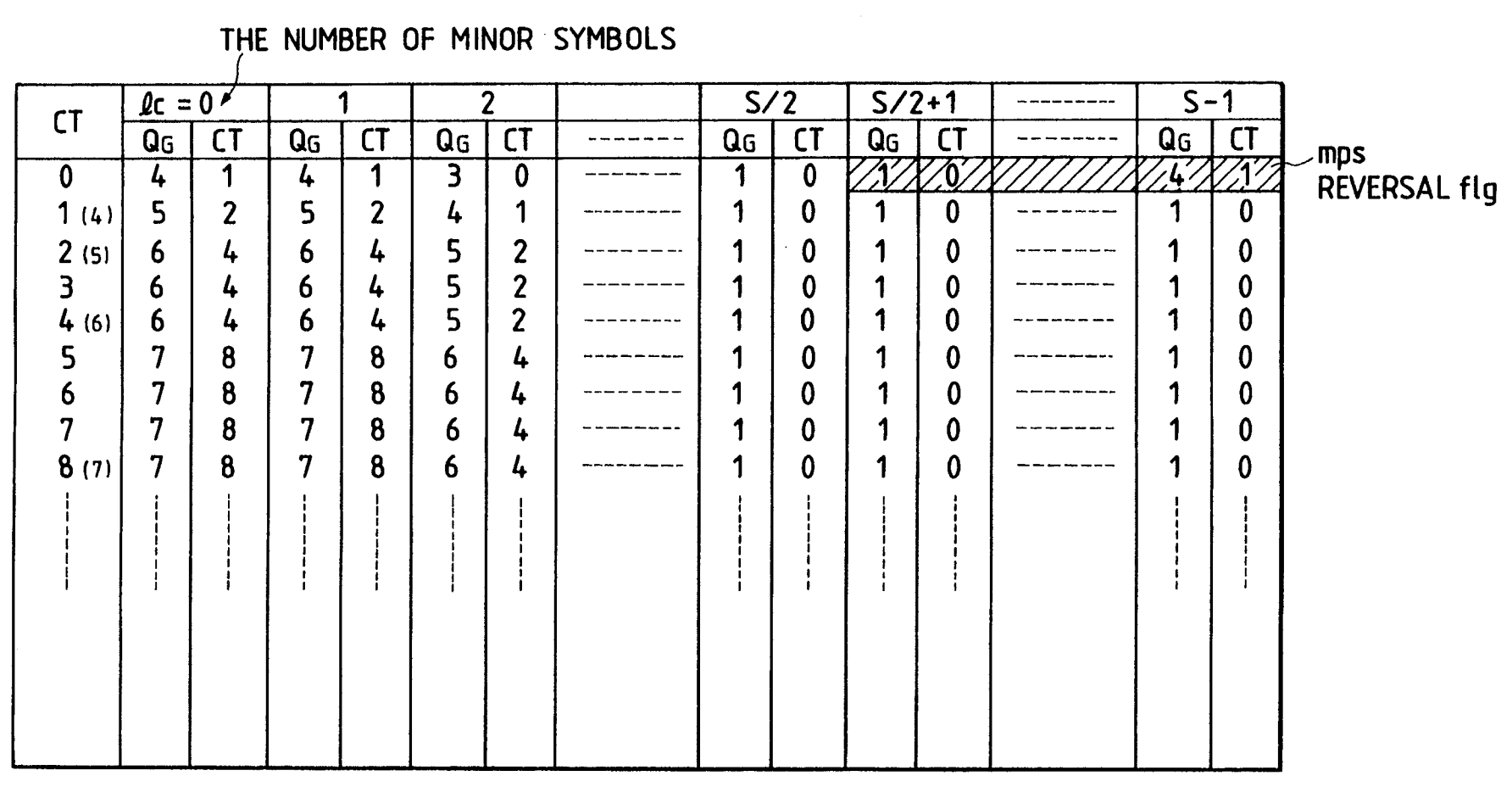

| CT | $\ell c = 0$ | | 1 | | 2 | | ... | S/2 | | S/2+1 | | ... | S-1 | |
|---|---|---|---|---|---|---|---|---|---|---|---|---|---|---|
| | $Q_G$ | CT | $Q_G$ | CT | $Q_G$ | CT | | $Q_G$ | CT | $Q_G$ | CT | | $Q_G$ | CT |
| 0 | 4 | 1 | 4 | 1 | 3 | 0 | --- | 1 | 0 | 1※ | 0※ | --- | 4※ | 1※ |
| 1 (4) | 5 | 2 | 5 | 2 | 4 | 1 | --- | 1 | 0 | 1 | 0 | --- | 1 | 0 |
| 2 (5) | 6 | 4 | 6 | 4 | 5 | 2 | --- | 1 | 0 | 1 | 0 | --- | 1 | 0 |
| 3 | 6 | 4 | 6 | 4 | 5 | 2 | --- | 1 | 0 | 1 | 0 | --- | 1 | 0 |
| 4 (6) | 7 | 8 | 6 | 4 | 5 | 2 | --- | 1 | 0 | 1 | 0 | --- | 1 | 0 |
| 5 | 7 | 8 | 7 | 8 | 6 | 4 | --- | 1 | 0 | 1 | 0 | --- | 1 | 0 |
| 6 | 7 | 8 | 7 | 8 | 6 | 4 | --- | 1 | 0 | 1 | 0 | --- | 1 | 0 |
| 7 | 7 | 8 | 7 | 8 | 6 | 4 | --- | 1 | 0 | 1 | 0 | --- | 1 | 0 |
| 8 (7) | --- | --- | --- | --- | --- | --- | --- | --- | --- | --- | --- | --- | --- | --- |

THE NUMBER OF MINOR SYMBOLS mps REVERSAL flg (※ column)

IMAGE ENCODING APPARATUS

This application is a continuation, of application Ser. No. 07/458,362, filed Dec. 28, 1989 now abandoned.

BACKGROUND OF THE INVENTION:

1. Field of the Invention

The present invention relates to an image encoding apparatus and, more particularly, to a binary image hierarchical encoding apparatus in a still image communication apparatus.

2. Related Background Art

A facsimile apparatus as a typical still image communication apparatus adopts a system for sequentially scanning, encoding and transmitting an image. This system requires a long transmission time since all image data must be transmitted, and is difficult to be apply to image communication services such as an image data base service, videotex, and the like, which require quick judgment of an image. In order to realize such a service, a system different from that employed in the facsimile apparatus is proposed ("Sequential Reproduction/Encoding System of Facsimile Signal Suitable for Conversational Image Communication", Endo and Yamasaki, Shingakuron (B), J67-B12, pp. 1462-1469 (1984)). In this system, when one image is transmitted, rough image information is transmitted first, and additional information is transmitted later, to generate detailed image data.

However, since the rough image information to be transmitted first is generated by omitting pixels at specific intervals from an original image, valid image information often cannot be transmitted at an initial stage, depending on the type of image. For example, a straight line having a width of one pixel may be deleted.

When dynamic arithmetic encoding is employed in the sequential reproduction/encoding system, if images at respective stages are classified to the same number of states, the number of symbols assigned to each state is decreased at a stage having a low resolution. For this reason, encoding is ended before a skew value in dynamic arithmetic encoding can be sufficiently converged, resulting in poor encoding efficiency.

SUMMARY OF THE INVENTION:

The present invention has been made in consideration of the above situation, and has as its object to provide an image encoding apparatus which can efficiently encode image information without omitting image information.

It is another object of the present invention to provide an image encoding apparatus in which, when a second image having a different resolution is formed based on a first image and the images are encoded, the second image can be encoded without losing information of the first image.

It is still another object of the present invention to provide an image encoding apparatus which can execute efficient encoding by performing encoding suitable for the resolution of an image to be encoded.

The above and other objects, effects, and features of the present invention will be more fully apparent from the following detailed description of the preferred embodiments, taken in conjunction with the accompanying drawings.

BRIEF DESCRIPTION OF THE DRAWINGS:

FIG. 6 is a block diagram of exception processing for fine line processing;

FIGS. 7A to 8B show exceptional patterns;

FIG. 10 is a view for explaining a reference pixel on an encoding surface;

FIG. 11 is a view for explaining a reference pixel of pixels at an immediately preceding stage;

FIG. 16 is a view showing another embodiment of adjusting a smoothing effect;

FIG. 17 is a block diagram of another embodiment of a circuit for dynamically changing a value Q;

FIG. 18 is a table showing reference pixels at respective stages of this embodiment;

FIG. 19 is a table for determining arithmetic code parameters; and

FIG. 20 is a table used in Embodiment 2 of the present invention.

DETAILED DESCRIPTION OF THE PREFERRED EMBODIMENTS:

Some preferred embodiments of the present invention will be described below.

Embodiment 1

Figure 1:
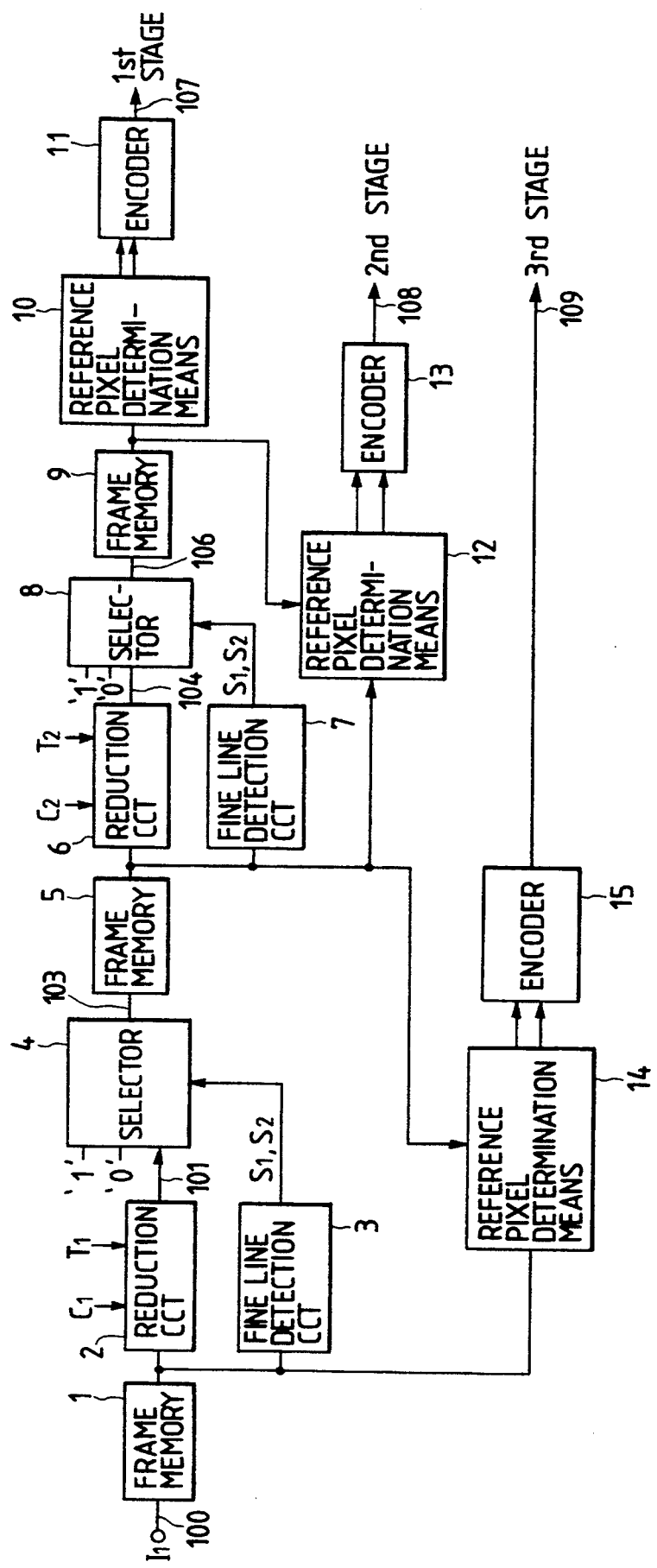
FIG. 1 is a block diagram of an embodiment of an encoding unit according to the present invention.

FIG. 1 shows an embodiment of an encoding unit of the present invention.

Original image data $I_1$ is stored in a frame memory 1. The original image data read out from the frame memory 1 is reduced by a reduction circuit 2, and is output as a signal 101. At the same time, the original image data read out from the frame memory 1 is input to a fine line detection circuit 3. The fine line detection circuit 3 detects a fine line, and outputs selection signals $S_1$ and $S_2$ in accordance with the detection result. The signals $S_1$ and $S_2$ are input to a selector 4. The selector 4 outputs "1", "0", or the signal 101 as a signal 103. The signal 103 is stored in a frame memory 5. The signal stored in the frame memory 5 corresponds to ½ original image data.

The fine line detection circuit 3 is arranged in parallel with the reduction circuit 2, and reduced image data is formed based on the output from the fine line detection circuit 3. Thus, a fine line which would be lost if only the reduction circuit 2 were used (i.e., if circuit 3 were absent can be preserved. Similarly, the ½ image data read out from the frame memory 5 is reduced to a ¼ original image by a reduction circuit 6, a fine line detection circuit 7, and a selector 8, and is stored in a frame memory 9 as ¼ image data.

Reference pixel determination means (or circuits) 10, 12, and 14 respectively detect sizes (the numbers of pixels) of image data stored in the frame memories 9, 5, and 1, and set the optimal numbers of pixels and optimal reference pixel positions in encoding.

An encoder 11 encodes the ¼ image data stored in the frame memory 9 using the reference pixel set by the reference pixel determination means 10, and outputs the encoded data as a first-stage signal 107. Similarly, encoders 13 and 15 encode the ½ image data and original image data stored in the frame memories 5 and 1 using the reference pixels set by the reference pixel determination means 12 and 14, and output encoded data as second- and third-stage signals 108 and 109, respectively.

In this manner, the first- to third-stage image data are encoded and transmitted in turn, starting with image data having a lower resolution, so that a receiver side can quickly identify the entire image. If the receiver side does not need the data, it can stop the following transmission. Thus, an efficient image communication service can be provided.

So far, a description has been made up to the third stage. However, the number of encoding stages can be arbitrarily expanded, as a matter of course.

Figures 2, 3:
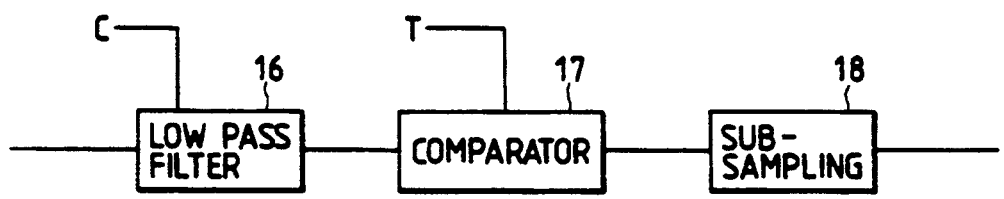
FIG. 2 is a block diagram of a reduction circuit.
FIG. 3 is a view showing coefficients of a low-pass filter.

FIG. 2 is a block diagram of the reduction circuits 2 and 6. Each reduction circuit comprises a low-pass filter 16, a comparator 17, and a sub-sampling circuit 18. A parameter C for adjusting a degree of smoothness is input to the low-pass filter 16. A threshold value T is input to the comparator 17. These values are determined based on required image quality and encoding efficiency. A signal output from the low-pass filter 16 is binarized by the comparator 17 based on the threshold value T. The binarized signal is thinned by the sub-sampling circuit 18 to ½ in the vertical and horizontal directions. FIG. 3 shows filter coefficients of the low-pass filter 16 having a 3×3 pixel size. A weighting coefficient of the central pixel is represented by C, a weighting coefficient of 2 is assigned to four pixels closest to the central pixel, and a weighting coefficient of 1 is assigned to the next closest pixels.

Thus, if the value of the central pixel is represented by $D_{i,j}$ (i=1 to M, j=1 to N: M and N are pixel sizes in the horizontal and vertical directions), an average density W is given by:

$$W = (D_{i-1,j-1} + 2D_{i,j-1} + D_{i+1,j-1} + 2D_{i-1,j} + CD_{i,j} + 2D_{i+1,j} + D_{i-1,j+1} + 2D_{i,j+1} + D_{i+1,j+1})$$

This density is binarized by the threshold value T (T= (12+C)/2 is a standard setup value).

The density W and the threshold value T have the following correspondences:

$$\begin{cases} \text{When } W \geq T, \text{ output signal} = 1 \\ \text{When } W \leq T, \text{ output signal} = 0 \end{cases}$$

Figure 4:
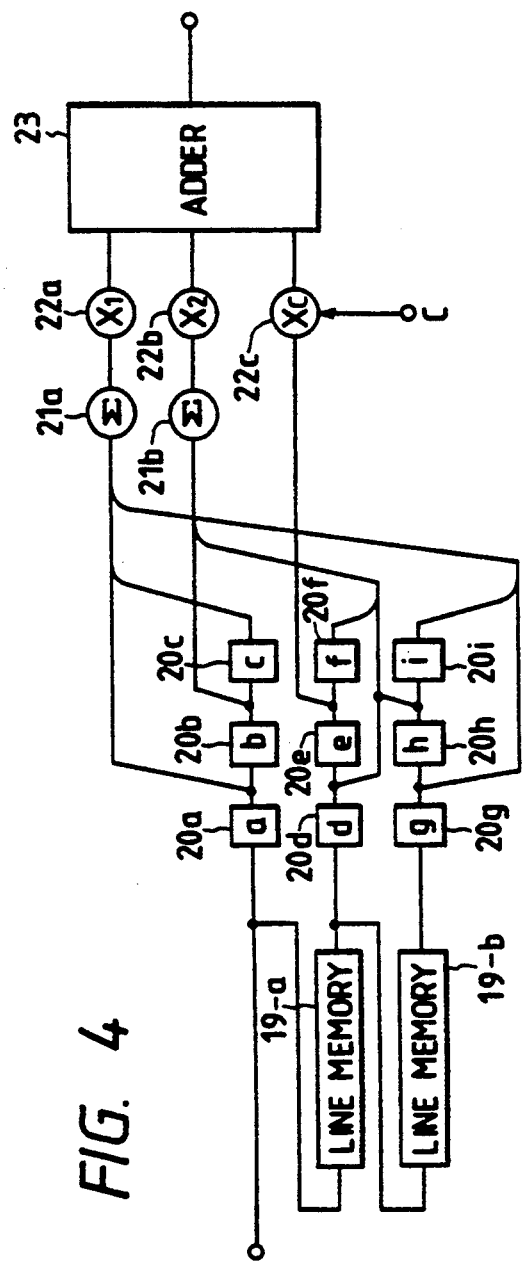
FIG. 4 is a block diagram showing an embodiment of the low, pass filter.

FIG. 4 is a block diagram of the low-pass filter 16. An input signal is held in latches 20a, 20b, and 20c to be delayed by one pixel clock. An input signal delayed by one line is held in each of line memories 19-a and 19-b. Thus, signals whose pixel positions correspond to the latches 20a, 20b, and 20c can be obtained from latches 20d, 20e, and 20f or latches 20g, 20h, and 20i. Thus, data of nine pixels as shown in FIG. 3 can be obtained. The output signals from the latches 20a, 20c, 20g, and 20i are added by an adder 21a to calculate a total sum. The total sum output from the adder 21a is multiplied by a constant (×1) by a multiplier 22a.

The output signals from the latches 20b, 20d, 20f, and 20h are added by an adder 21b to calculate a total sum. The total sum from the adder 21b is multiplied by a constant (×2) by a multiplier 22b. The output signal from the latch 20e (i.e., data of the central pixel) is multiplied by a constant (×C) by a multiplier 22c. The C value can be externally set.

The output signals from the multipliers 22a, 22b, and 22c are added by an adder 23 to calculate a total sum W. The total sum W is then output. The output signal from the adder 23 is compared with the threshold value T by the comparator 17 (FIG. 2). When the total sum W is larger than the threshold value T, a signal "1" is obtained; otherwise, a signal "0" is obtained. The threshold value T can also be externally set. The threshold value T takes a value of T = (12+C)/2 as a standard value.

Figure 5:
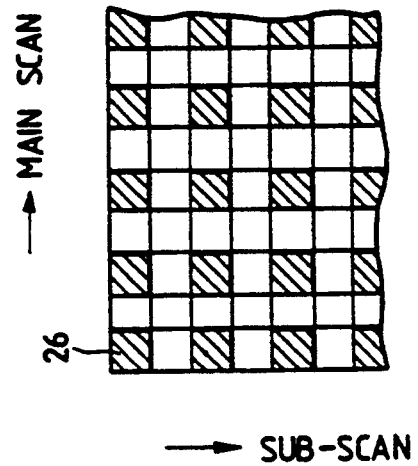
FIG. 5 is a view for explaining an operation of a sub-sampling circuit.

FIG. 5 is a view for explaining an operation of the sub-sampling circuit 18. Hatched pixel data (FIG. 5) are sampled at every other timing respectively in the main scan and sub-scan directions, thereby forming a sub-sampling image of the ½ size (¼ in terms of an area). This operation can be easily realized by adjusting latch timings of image data.

The fine line detection circuits 3 and 7 will be described below.

When image reduction is performed by only the reduction circuits 2 and 6 (FIG. 2), a fine line or the like of a one-pixel width may be lost. FIGS. 7A and 8A show examples of such images. In the case of a black line of a one-pixel width which does not pass the central pixel of the low-pass filter, as shown in FIG. 7A, the low-pass filter output (FIG. 3) becomes 4, and this black line disappears unless the threshold value T of the comparator (FIG. 2) is set to be 4 or less. Similarly, a white line (black background) shown in FIG. 8A disappears unless the threshold value T is set to be (C+8) or more. In consideration of the above drawbacks, the fine line detection circuits 3 and 7 shown in FIG. 2 detect fine lines according to the following principle. In general, an edge of an image can be detected by a linear differential filter. For example, in the case of the image shown in FIG. 7A, an edge changing from black to white can be detected by a linear differential filter of 3×3 pixels shown in FIG. 7B. More specifically, only when an edge changing from black to white is present, a power of the filtering result is increased. The filtering result in FIG. 7A is 3. In the case of the image shown in FIG. 8A, an edge changing from white to black can be detected by a linear differential filter shown in FIG. 8B. In this case, a power of the filtering result is also 3.

FIG. 6 is a block diagram of the fine line detection circuits 3 and 7. In FIG. 6, an arithmetic operation for fine line detection using the linear differential filter is simplified.

The circuit shown in FIG. 6 includes line memories 24a, 24b, and 24c for respectively holding input pixels of one line, latches 25a to 25k for temporarily storing reference pixels used in an arithmetic operation corresponding to linear differentiation, a latch 60 for adjusting a timing, AND gates 61a to 61l, inverters 62a to 62n, and OR gates 63a and 63b.

An input signal is held in the latches 25*i*, 25*j*, and 25*k* to be delayed by one pixel clock. The line memories 24*a*, 24*b*, and 24*c* respectively hold input signals delayed by one line. Signals whose pixel positions correspond to the latches 25*i*, 25*j*, and 25*k* can be obtained from the latches 25*f*, 25*g*, and 25*h*, and the latches 25*c*, 25*d*, and 25*e*. In this case, the pixel data (central pixel) held in the latch 25*g* corresponds to the data held in the latch 20*e* shown in FIG. 4.

More specifically, 3×3 pixels stored in the latches 25*k*, 25*j*, 25*i*, 25*h*, 25*g*, 25*f*, 25*e*, 25*d*, and 25*c* respectively correspond to the 3×3 pixel latches 20*a*, 20*b*, 20*c*, 20*d*, 20*e*, 20*f*, 20*g*, 20*h*, and 20*i* in FIG. 4.

The latch 25*a* latches a pixel two lines before the pixel of interest (sometimes referred to herein as the "noticed pixel") throughthe line memory 24*c* and the latch 60. The latch 25*b* latches a pixel two pixels before the pixel of interest.

A linear differential value can be calculated based on the 3×3 pixels latched in the latches 25*c* to 25*k* in FIG. 6. In order to simplify an arithmetic operation, the following logical formula is taken into consideration. If data held in the latches 25*a* to 25*k* in FIG. 6 are represented by $\underline{a}$ to $\underline{k}$, reversed data of the data $\underline{a}$ to $\underline{k}$ are represented by $\bar{a}$ to $\bar{k}$, a logical sum is represented by "+", and a logical product is represented by "·", the following logical formula can be considered in place of the linear differential filter shown in FIG. 7B (note that the black line having a one-pixel width shown in FIG. 7A corresponds to $\underline{c}$, $\underline{f}$, and $\underline{i}$.;

$$V_B = (c \cdot f \cdot i) \cdot (\bar{e} \cdot \bar{h} \cdot \bar{k})$$

If $V_B=1$, the presence of an edge is determined; if $V_B=0$, the absence of an edge is determined. Thus, an edge changing from black to white can be detected. However, since an edge of a fine line of two pixels or more is also detected, this detection is not preferable in reduction for reducing two pixels to one pixel.

Therefore, only when a pixel one pixel before the black line in FIG. 7A. i.e. a pixel latched in the latch 25*b* in FIG. 6, is white, is this detection is performed, so that only a line edge of a one-pixel width can be detected. That is, $$V'_B = (c \cdot f \cdot i \cdot (\bar{e} \cdot \bar{h} \cdot \bar{k}) \cdot b$$

Thus, it can be determined that when $V'_B=1$, a line of a one-pixel width is detected; when $V'_B=0$, no line is detected.

Similarly, the white line of a one-pixel width shown in FIG. 8A can be detected by:

$$V'_B = (\bar{c} \cdot \bar{f} \cdot \bar{i}) \cdot (e \cdot h \cdot k) \cdot b$$

Thus, it can be determined that the white line having a one-pixel width is detected when $V'_W=1$.

The logical formulas $V'_B$ and $V'_W$ are used for detecting vertical black and white lines each having a one-pixel width. Logical formulas for horizontal black and white lines each having a one-pixel width can be similarly obtained. If these formulas are represented by $H'_B$ and $H'_W$, they are expressed as:

$$H'_B = (c \cdot d \cdot e) \cdot (\bar{i} \cdot \bar{j} \cdot \bar{k}) \cdot a$$

$$H'_W = (\bar{c} \cdot \bar{d} \cdot \bar{e}) \cdot (i \cdot j \cdot k) \cdot a$$

When $H'_B$ and $H'_W$ are 1, the presence of the black and white lines having a one-line width can be detected.

The vertical and horizontal black and white lines having a one-pixel width can be simultaneously detected by the following equations:

$$S1 = (c \cdot f \cdot i) \cdot (\bar{e} \cdot \bar{h} \cdot \bar{k}) \cdot b + (\bar{c} \cdot \bar{d} \cdot \bar{e}) \cdot (\bar{i} \cdot \bar{j} \cdot \bar{k}) \cdot a$$

$$S2 = (\bar{c} \cdot \bar{f} \cdot \bar{i}) \cdot (e \cdot h \cdot k) \cdot b + (\bar{c} \cdot \bar{d} \cdot \bar{e}) \cdot (i \cdot j \cdot k) \cdot a$$

More specifically, when the signal S1 is "1", it indicates that a black line of a one-pixel width is present; when the signal S2 is "1", it indicates that a white line of a one-pixel width is present. When the signals S1 and S2 are used as compensation signals of the output results of the reduction circuits 2 and 6 (FIG. 1), reduction can be performed while preserving a fine line of a one-pixel width. When (S1, S2) = (1, 0) in FIG. 1, the outputs from the selectors 4 and 8 are "1", i.e., a signal indicating that a black line of a one-pixel width is detected is output; when (S1, S2) = (0, 1), the outputs from the selectors 4 and 8 are "0", i.e., a signal indicating that a white line of a one-pixel width is detected is output. Other cases, signals output from the reduction circuits 2 and 6 are selected by the selectors 4 and 8.

As described above, when a simple fine line detection circuit which performs an operation equivalent to the linear differential filter is arranged, a line which is lost by low-pass filtering can be preserved, and quality of a reduced image can be improved.

In this embodiment, the line memories and latches constituting the low-pass filter are different from those constituting the fine line detection circuits. Some of the line memories and latches of the fine line detection circuit can be commonly used as those for the low-pass filter.

Encoding in the encoders 11, 13, and 15 will be described below.

The encoders 11, 13, and 15 perform an encoding operation in accordance with arithmetic codes.

With the arithmetic code of this embodiment, a value of the noticed pixel is predicted from reference pixels (here, surrounding pixels). A symbol of the predicted pixel is given by a major symbol, symbols of other pixels are given by minor symbols, and the probability of generation of minor symbols is represented by P. With these data, encoding is performed.

If a binary arithmetic code and its auxiliary amount for a code string S are respectively represented by C(S) and A(S), encoding progresses by the following arithmetic operations:

$$\left. \begin{array}{l} A(S1) = A(S) \cdot P(S) = A(S) \cdot 2^{-Q(S)} \\ A(S0) = A(S) - A(S1) \\ A(S1) = C(S) + A(S0) \\ C(S0) = C(S) \end{array} \right\} (1)$$

where A(null) = 0.11 ... 1

Since P(S) is approximated by $P(S) = 2^{-Q(S)}$, multiplication can be performed by only shifting a binary value. Q is called a skew value, and when this parameter is changed, an arithmetic code can be dynamically used.

In decoding, a binary signal string S is given by S = S' × S''. When decoding is performed up to S', C(S) and C(S') + A(S'0) are compared. When C(S) > C(S') + A(S'0), x is decoded to be x = 1; otherwise, x is decoded to be x = 0.

Figure 9:
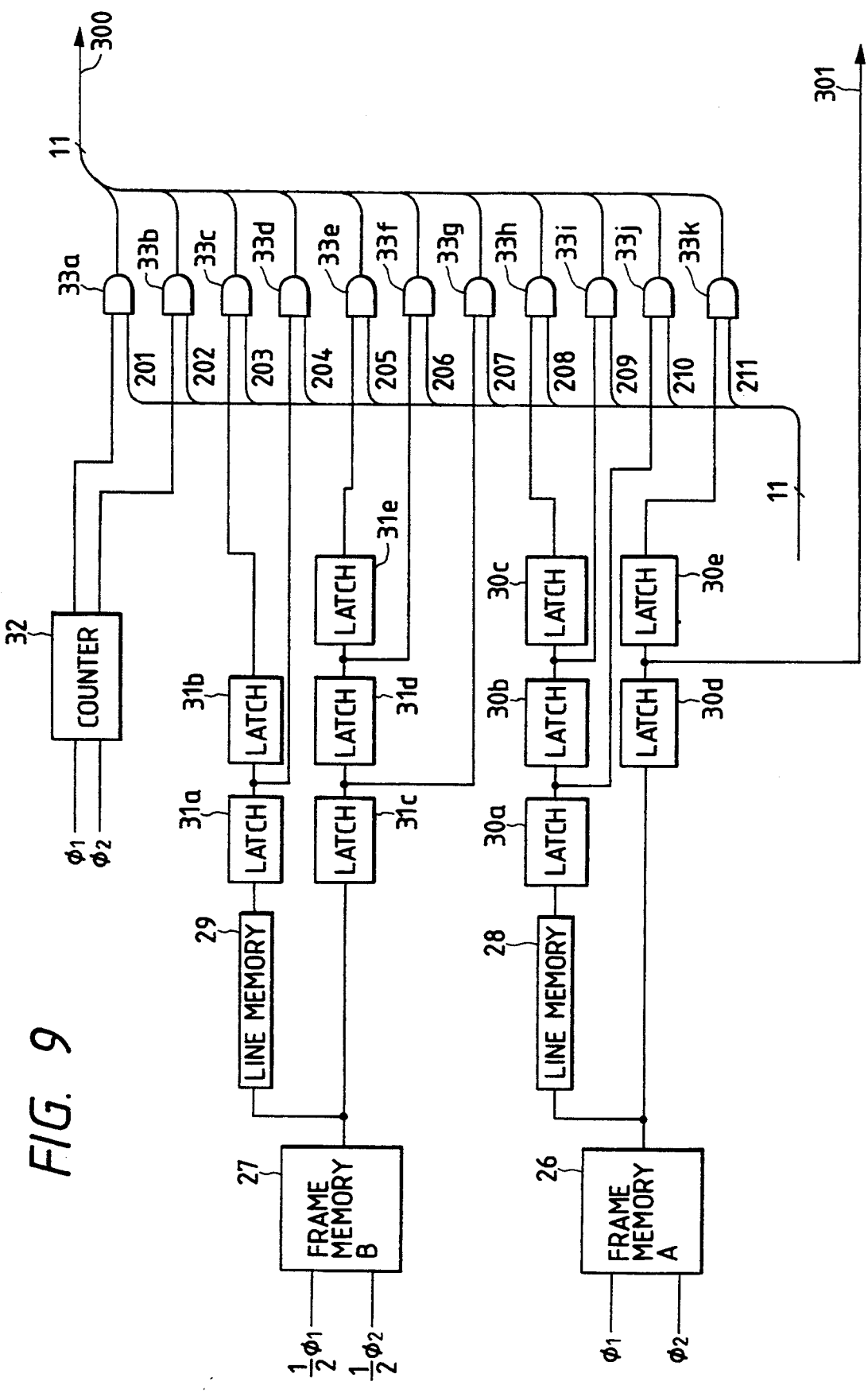
FIG. 9 is a block diagram of a reference pixel determination means.

FIG. 9 is a block diagram of a circuit for predicting a pixel of interest.

A frame memory 26 stores image data to be encoded. A frame memory 27 stores image data obtained by ½ sub-sampling the image (image sent in the immediately preceding stage) stored in the frame memory 26. The memories 26 and 27 respectively comprise two-dimensional memories. If a clock of an x address is represented by $\phi_1$ and a clock of a y address is represented by $\phi_2$, the clocks $\phi_1$ and $\phi_2$ are supplied to the frame memory A, and clocks ½$\phi_1$ and ½$\angle_2$ each having a ½ frequency are supplied to the frame memory B. Thus, one pixel in the frame memory B corresponds to 2×2, i.e., four pixels in the frame memory A.

Data from the frame memories 26 and 27 become one-line delayed data in line memories 28 and 29, and these data are then input to latches 30a to 30c and 31a and 31b. Each latch latches data delayed by one pixel. If the outputs from these latches are caused to correspond to pixel positions shown in FIG. 10, a pixel of interest (*) corresponds to the output from the latch 30d; a pixel No. 1 in FIG. 10, the latch 30e; No. 2, the latch 30b; No. 3, 30a; and No. 4, the latch 30c.

In pixel positions shown in FIG. 11, a pixel No. 5 corresponds to the output from the latch 31b; No. 6, the latch 31a; No. 7, the latch 31d; No. 8, the latch 31c; and No. 9, the latch 31e.

Note that the pixel No. 5 in FIG. 11 is one including a pixel of interest. A 2-bit signal for identifying the position of the pixel of interest in the pixel No. 5 (four states of upper left, upper right, lower left, and lower right) is generated by a counter 32 based on the clocks $\phi_1$ and $\phi_2$. AND gates 33a to 33k calculate logical products between signals 201 to 211 set by a controller (not shown) and outputs from the latches 30a to 30c, 30e, and 31a to 31e, and the counter, respectively, thereby outputting a prediction signal 300 of the pixel of interest. The operation of this portion will be described in detail below.

In general, when encoding is dynamically performed, a pixel of interest is predicted from states of surrounding pixels, and a skew value is updated while calculating a "hit" probability of prediction. Therefore, in order to reflect the statistic nature of a symbol string to be encoded in a skew value, a considerable number of symbols for grasping the statistic nature are required in each state. For example, if the total number of symbols is 65,536, when the number of states is $2^{11}$, an average number of symbols assigned to each state is 32, and it is difficult to grasp the statistic nature of the symbol string in each state.

This embodiment takes this respect into consideration, and a controller (not shown) controls the number of predicted states in accordance with the number of symbols to be encoded. More specifically, in hierarchical encoding, since an image is reduced in every stage, the number of symbols to be encoded is smallest in the first stage, and it is increased toward the higher stages like the second stage, the third stage, etc. When the number of symbols is small, the signals 203, 209, and 211 of the signals 201 to 211 are set to be "1", and the remaining signals are set to be "0", so that 3 bits (8 states) can be used as the number of states. As the number of symbols is increased, the number of "1"s set in the signals 201 to 211 is increased, thus increasing the number of states.

FIG. 18 shows an example of values of the signals 201 to 211 in this embodiment. This is merely an example, and the way of setting the states and signals to be set are not limited to this.

Figure 12:
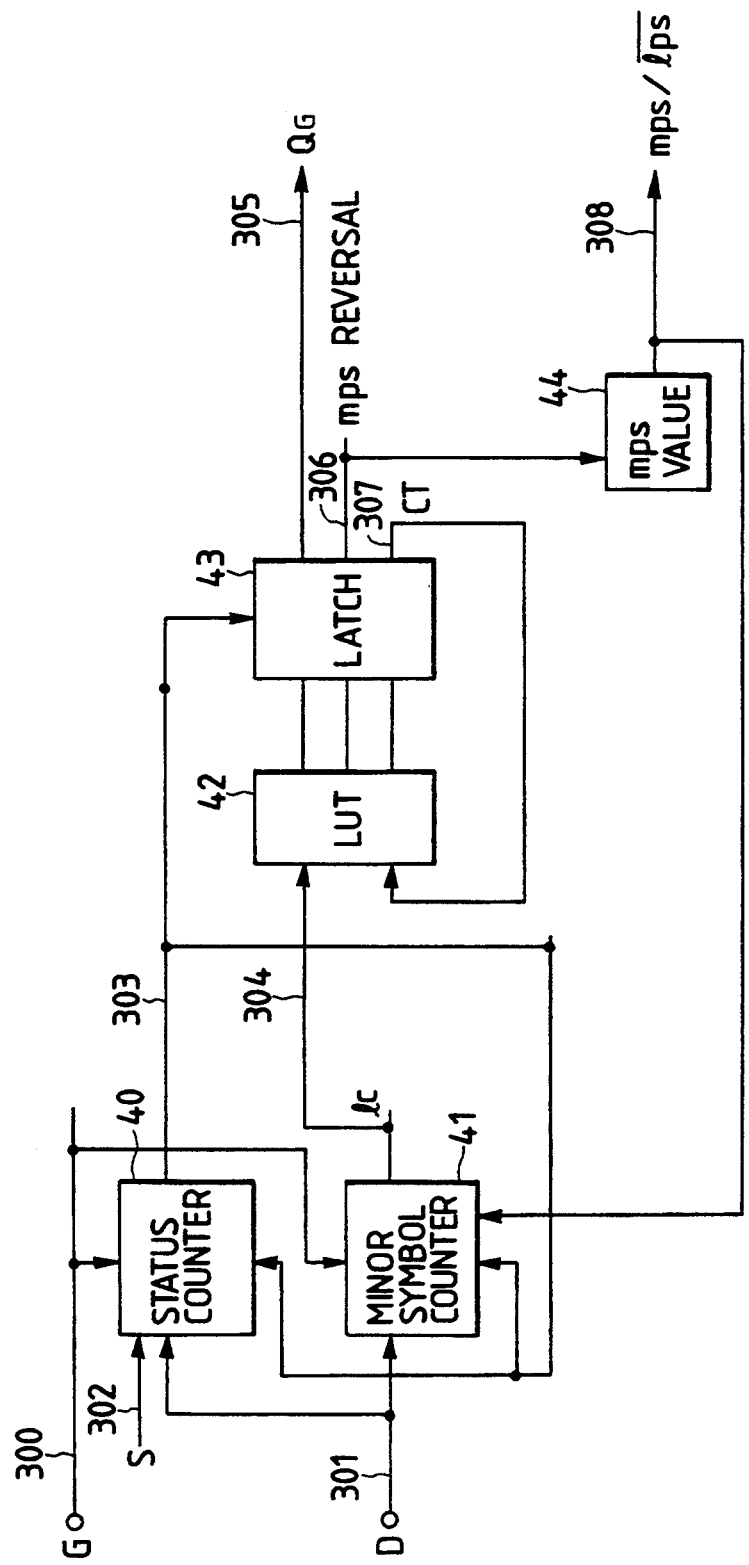
FIG. 12 is a block diagram of a circuit for dynamically changing a skew value Q.

FIG. 12 is a block diagram of a circuit for dynamically changing the skew value Q and a minor symbol lps. A status signal G300 and a pixel of interest D301 are respectively input to a status counter 40 and a minor symbol counter 41. In each counter, internal counters corresponding in number to the states are prepared to allow a count operation in units of states, and are selected by a status signal G.

The status counter 40 counts the number of generation times of a certain state for each state. When the count value exceeds a setup value S302, the counter 40 outputs an updating signal 303. The counter 41 counts, in units of states, the number of minor symbols generated from when the immediately preceding updating signal is generated until the next updating signal is generated, and outputs a count value lc 304. More specifically, of S times of generation of a certain state, lc minor symbols are generated. In the following description, a state of S=16 will be exemplified.

An LUT 42 prestores $Q_G$ 305 as the next encoding parameter, a signal 306 for reversing mps (major symbols) so far, and data called a zero count (CT) 307 for generation of lc minor symbols.

The zero count is a value representing a count of "0" states so far, i.e., states wherein no minor symbol lc is generated in S states. More specifically, when CT=0 is initially set, if a state wherein lc is zero occurs among S states, CT is updated to be CT=1. Thereafter, if such a state continues twice, three times, etc. CT is updated to CT=2, CT=3, . . . .

FIG. 19 shows an example of the content of the LUT 42.

In an initial state, CT=0 is set, and new $Q_G$ and the next CT value are obtained based on the lc value.

For example, if CT=0 and lc=0, $Q_G$=4 and CT=1. When the next updating signal 303 is input, $Q_G$=5 and CT=2 if CT=1 and lc=0.

When CT=0 and lc=1, the above values are updated to $Q_G$=4 and CT=1. An equation for forming this table is given by:

$$Q_G \simeq -\log 2 \frac{lc}{S \times (CT + 1)} \quad (1)$$

When lc=0, a calculation is made with lc=1.

$$CT \simeq N\left[\frac{2^{Q_G} - 1}{S}\right] \quad (2)$$

where N[x] is a closest integer value.

In equation (1), an exponential part when the generation probability of minor symbols generated when S states continue (CT+1) times is approximated by a power of 2 is given by $Q_G$.

In equation (2), CT recalculates the number of sets of S "lc=0"s assuming that the number of minor symbols generated is ½$^{Q_G}$. Since $2^{Q_G}-1$ represents the number of major symbols, CT is obtained by dividing it by S.

When CT=0 and lc>S/2+1, this state is processed as a special case, and an mps reversal signal is output to reverse a value as a current minor symbol (i.e., 0⇌1). If the state thereafter does not correspond to CT=0 and lc>S/2+1, encoding processing is normally performed while the minor symbol is left changed.

In FIG. 12, a latch 43 latches the current skew value $Q_G$ 305, the mps reversal signal 306, and CT 307, and latches the output from the LUT 42 in response to the updating signal 303 to be updated to a new state.

The LUT 42 receives the count signal lc of minor symbols, and the previous CT value 307, and outputs the skew value QG, the mps reversal signal, and CT which are updated according to FIG. 19. An mps value latch 44 latches a major symbol used in encoding so far, and this state is updated by the mps reversal signal. An mps/$\overline{\text{lps}}$ signal as an output of the latch 44 is supplied to the minor symbol counter.

Encoding is performed based on the determined skew value QG and mps/$\overline{\text{lps}}$.

Figure 13:
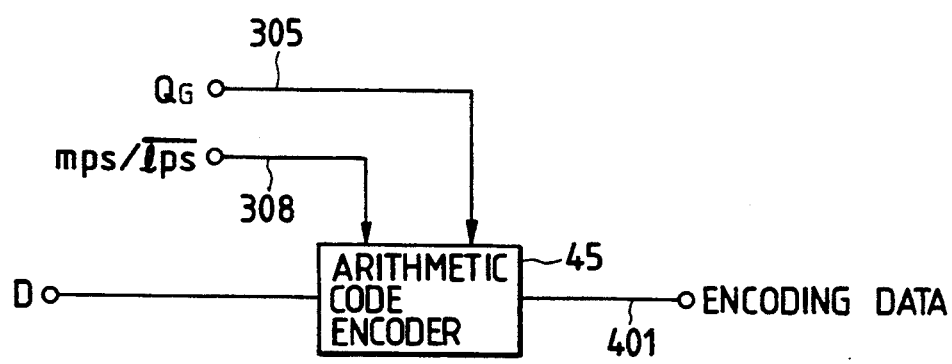
FIG. 13 is a block diagram of an arithmetic code encoder.

FIG. 13 is a block diagram of an arithmetic code encoder. If a skew value is assumed to be the skew value $Q_G$ 305 from the latch 43 shown in FIG. 12, the skew value $Q_G$ 305 and the mps$\overline{\text{lps}}$ signal 308 are input, so that an arithmetic operation given by equation (1) of pixel of interest data D is performed by an encoder, thus obtaining encoding data 401.

Figure 14:
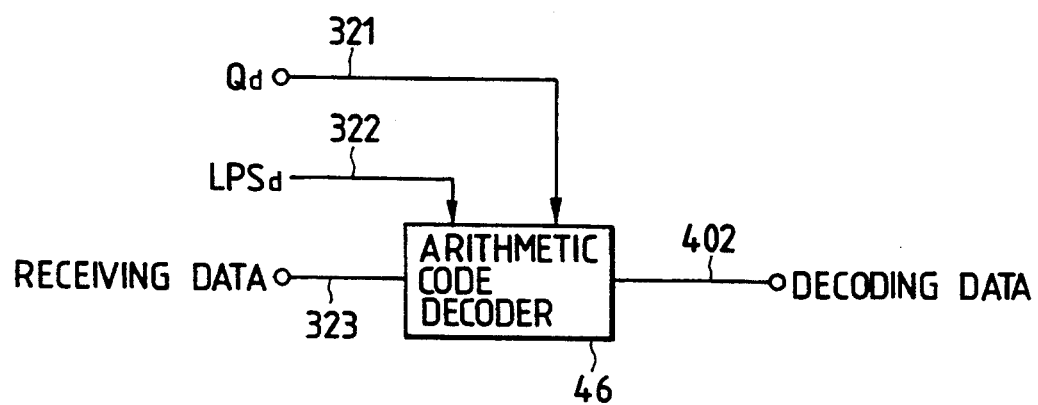
FIG. 14 is a block diagram of an arithmetic code decoder.

FIG. 14 is a block diagram of a decoder. The same prediction circuit (FIG. 9) and dynamic adaptive circuit as in the encoding unit are prepared in the decoding side. A decoder 46 performs a decoding arithmetic operation using a skew value $Q_D$ 321 of a decoder side, and a minor symbol $LPS_D$ 322 and receiving data 323 from an LUT, thus obtaining decoding data 402.

Figure 15:
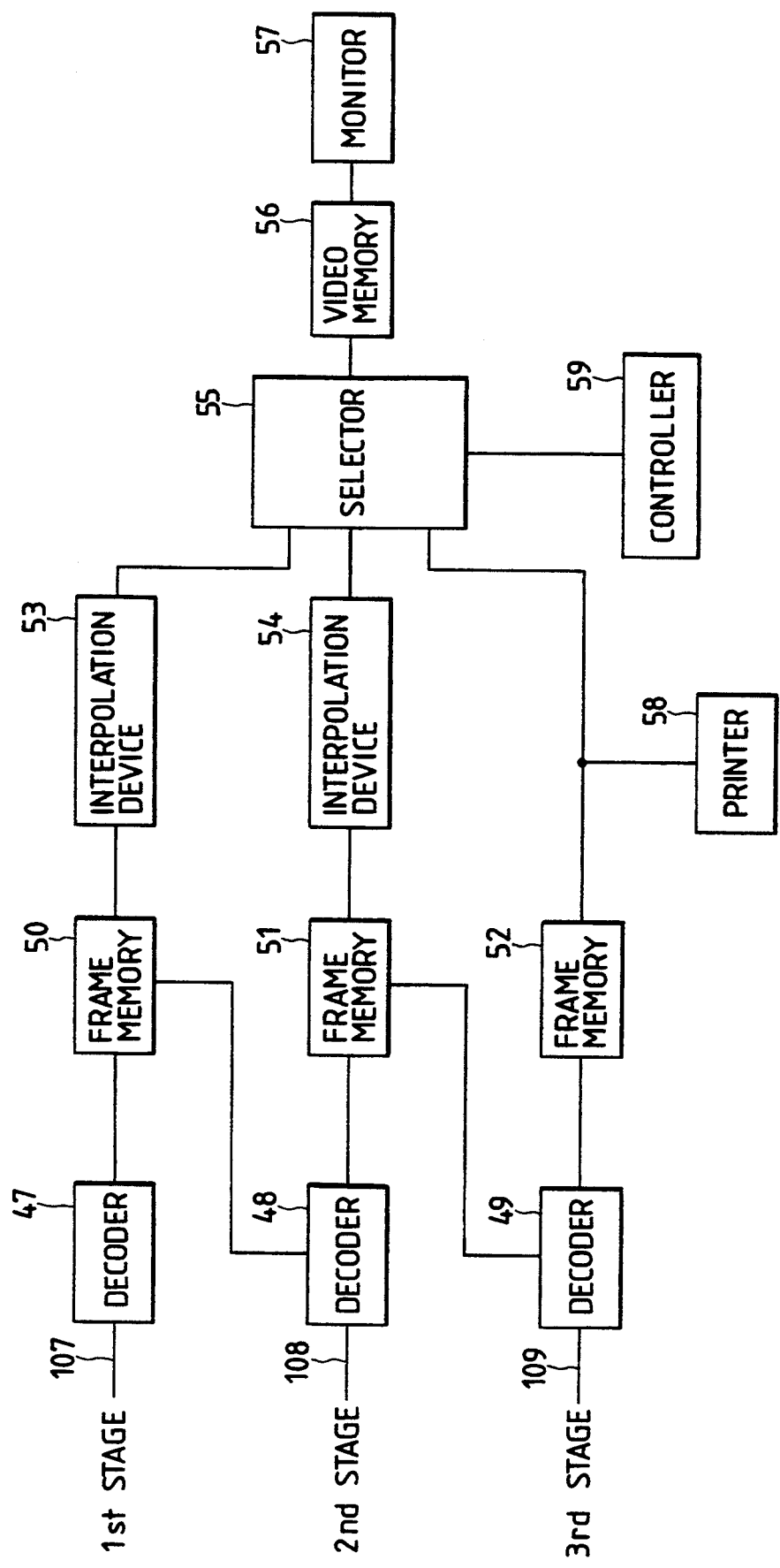
FIG. 15 is a block diagram of an embodiment of a decoding unit according to the present invention.

FIG. 15 shows an embodiment of a decoding unit.

The first-stage signal 107 is decoded by a decoder 47, and is stored in a frame memory 50. This signal is converted to high-resolution data by $\times 4$ interpolation processing of an interpolation device 53. The high-resolution data is stored in a video memory 56 after a selector 55 is switched by a controller 59. The video memory 56 comprises a 2-port memory. Therefore, an image obtained at a receiver side is always displayed on a monitor 57. The second-stage signal 108 is decoded by a decoder 48 with reference to the data stored in the frame memory 50, and is stored in a frame memory 51. This data is subjected to $\times 2$ interpolation processing by an interpolation device 54, and is stored in the video memory 56 upon switching of the selector 55.

After the third-stage signal 109 is similarly decoded, it is displayed on the monitor 57.

A signal from a frame memory 52 as a decoded third-stage image signal is output to a printer 58 to obtain a hard copy.

Embodiment 2

The first embodiment employs a system for adjusting a degree of smoothness in accordance with a weighting coefficient of the central value of a $3\times 3$ coefficient matrix of the low-pass filter. As another embodiment of sub-sampling, when conversion data W is determined based on original image data $D_A$, $D_B$, $D_C$, and $D_D$, as shown in FIG. 16, if the data W is given by:

$$W = a_1 D_A + a_2 D_B + a_2 D_C + a_2 D_D$$

coefficient values of $a_1$ and $a_2$ are changed, so that the degree of smoothness and encoding efficiency can be adjusted.

In this case, $$T = \frac{a_1 + 3a_2}{2}$$

When $W \geq T$, 1;
When $W < T$, 0.
When $a_1 > a_2$, a ratio of determining data based on $D_A$ is increased, and encoding efficiency is improved.
When $a_1 = a_2$, a smoothing effect for an image is improved.

Embodiment 3

As another method for determining the content shown in FIG. 19, lc/S is obtained from the number of minor symbols lc among S pixels to determine a new skew value QG from FIG. 20. An initial value is $Q_G = 1$, and $Q_G$ is updated according to the value of lc/S. In the second and subsequent operations, $Q_G$ is determined using the updated $Q_G$ and lc/S. A value $Q_G$ in updating is calculated by, e.g., the following equation, and is stored in a table:

$$\frac{1}{2^{QG'}} \approx \frac{\frac{1}{2^{QG}} + \frac{lc}{S}}{2}$$

When $Q=1$ and lc/S $> \frac{1}{2}$ (500 in FIG. 20), major and minor symbols are reversed.

FIG. 17 shows an embodiment in this case, and a $Q_G$ signal 305 is input to an LUT 42 to determine $Q_G$ to be updated.

Embodiment 4

In the above embodiment, the available number of states is controlled in each stage. In this embodiment, the number of states can be controlled in accordance with an image size to be encoded. For example, when an image size of a third stage is $1024 \times 1024$ pixels, the number of states can be controlled to $2^7$ states; when it is $3072 \times 4096$ pixels, it can be controlled to $2^{11}$ states. In addition, the stages can be further segmented, and the reference pixel position and the number of reference pixels can be changed in units of image sizes.

If the type of data (e.g., a character image, halftone image, or the like) is known in advance, a reference pixel position suitable therefore is set to perform encoding.

As described above, in a system for encoding images stepwise from one having a lower resolution, the following effects can be provided.

(1) A filter for adjusting a smoothing effect for an image before it is subjected to resolution conversion is added, so that quality and encoding efficiency of an image at an initial stage to be transmitted can be arbitrarily selected.

(2) Simple exception processing as an application of a linear differential filter is provided, so that a character or a fine line which is lost in the prior are can be reproduced.

(3) The number of reference pixels and their positions are determined in accordance with the resolution of an image to be encoded, so that encoding efficiency approaches its entropy.

The preferred embodiments of the present invention have been described. The present invention is not limited to the arrangement of the above embodiments, and various other changes and modifications may be made within the spirit and scope of the invention.

What is claimed is:

1. An image encoding apparatus, comprising:
   inputting means for inputting a first image having a first resolution;
   forming means for forming a second image having a second resolution on the basis of the first image, the second resolution being lower than the first resolution; and
   encoding means for encoding the first and second images of which resolutions are different from each other, respectively, said encoding means encoding a target pixel with reference to reference pixels,
   wherein said encoding means encodes the first image as an image having the first resolution with reference to a first set of reference pixels and encodes the second image as an image having the second resolution with reference to a second set of reference pixels which are different in position from the first set of reference pixels.

2. An apparatus according to claim 1, wherein said encoding means encodes the target pixel with reference to surrounding pixels of the target pixel.

3. An apparatus according to claim 1, wherein said encoding means predicts a status of the target pixel with reference to the reference pixels.

4. An apparatus according to claim 1, wherein said forming means smooths the first image, binarizes the smoothed image, and sub-samples the binary image to form the second image.

5. An apparatus according to claim 1, said encoding means comprising:
   instructing means for instructing a resolution of an image to be encoded; and
   determining means for determining the positions of reference pixels in accordance with the resolution of the image to be encoded, instructed by said instruction means.

6. An image encoding method, comprising the steps of:
   inputting a first image having a first resolution;
   forming a second image having a second resolution on the basis of the first image, the second resolution being lower that the first resolution; and
   encoding the first and second images of which resolutions are different from each other, respectively, a target pixel being encoded with reference to reference pixels,
   wherein the first image as an image having the first resolution is encoded with reference to a first set of reference pixels and the second image as an image having the second resolution is encoded with reference to a second set of reference pixels which are different in positions from the first set of reference pixels.

7. A method according to claim 6, wherein, in said encoding step, the target pixel is encoded with reference to surrounding pixels of the target pixel.

8. A method according to claim 6, wherein, in said encoding step, a status of the target pixel is predicted with reference to the reference pixels.

9. A method according to claim 6, wherein, in said forming step, the first image is smoothed, the smoothed image is binarized, and the binary image is sub-sampled to form the second image.

10. A method according to claim 6 comprising the steps of:
    instructing a resolution of an image to be encoded; and
    determining the positions of reference pixels in accordance with the instructed resolution of the image to be encoded.

* * * * *

UNITED STATES PATENT AND TRADEMARK OFFICE
CERTIFICATE OF CORRECTION

PATENT NO. : 5,371,606
DATED : December 6, 1994
INVENTOR(S) : Akihiro Katayama et al It is certified that error appears in the above-indentified patent and that said Letters Patent is hereby corrected as shown below:

COLUMN 1

Line 18, "be" should be deleted.

COLUMN 2

Line 9, "low, pass" should read --low-pass--.
Line 66, "absent" should read --absent)--.

COLUMN 3

Line 38, "tions. FIG. 3" should read --tions.
                                                    FIG. 3--.
Line 50, "$_j^D{}_i-1,$" should read --$_j^{+D}i-1,$--.
Line 58, "When W $\geq$ T," should read --When $\geq$ T--.

COLUMN 5

Line 16, "throughthe" should read --through the--.
Line 24, "$\underline{a}$ to $\underline{k}$," should read --a to k,--; and
         "$\underline{a}$ to $\underline{k}$" should read --a to k--.

UNITED STATES PATENT AND TRADEMARK OFFICE
CERTIFICATE OF CORRECTION

PATENT NO. : 5,371,606

DATED : December 6, 1994

INVENTOR(S) : Akihiro Katayama et al

It is certified that error appears in the above-indentified patent and that said Letters Patent is hereby corrected as shown below:

COLUMN 5 (cont'd)

Line 25, "a to $\bar{k}$," should read --$\bar{a}$ to $\bar{k}$, --.
Line 30, "$\underline{i}$.;" should read --$\underline{i}$):--.
Line 39, "FIG. 7A." should read --FIG. 7A,--; and "i.e." should read --i.e.,--.

Line 44, "$V'_B = (c \cdot f \cdot i \cdot (\bar{e} \cdot \bar{h} \cdot \bar{k}) \cdot b$" should read --$V'_B = (c \cdot f \cdot i) \cdot (\bar{e} \cdot \bar{h} \cdot \bar{k}) \cdot b$--.

COLUMN 6

Line 5, "$S1 = (c \cdot f \cdot i) \cdot (\bar{e} \cdot \bar{h} \cdot \bar{k}) \cdot b + (\bar{c} \cdot \bar{d} \cdot \bar{e}) \cdot (\bar{i} \cdot \bar{j} \cdot \bar{k}) \cdot a$" should read
--$S1 = (c \cdot f \cdot i) \cdot (\bar{e} \cdot \bar{h} \cdot \bar{k} \cdot) \cdot \bar{b} + (c \cdot d \cdot e) \cdot (\bar{i} \cdot \bar{j} \cdot \bar{k}) \cdot \bar{a}$--.

COLUMN 7

Line 11, "½∠2" should read --½$\phi$2--.

COLUMN 8

Line 26, "''038" should read --"0".
Line 31, "etc." should read --etc.,--.

UNITED STATES PATENT AND TRADEMARK OFFICE
CERTIFICATE OF CORRECTION

PATENT NO. : 5,371,606
DATED : December 6, 1994
INVENTOR(S) : Akihiro Katayama et al It is certified that error appears in the above-indentified patent and that said Letters Patent is hereby corrected as shown below:

COLUMN 10

Line 7, "$\alpha_1 > \alpha_2,$" should read --$\alpha_1 >> \alpha_2,$--.
Line 17, "QG" should read --$Q_G$--.

Signed and Sealed this

Eleventh Day of July, 1995

BRUCE LEHMAN

Attest:

Attesting Officer        Commissioner of Patents and Trademarks